C. G. SPENCER.
ATTACHMENT FOR PNEUMATIC TIRE VALVES.
APPLICATION FILED NOV. 23, 1915.
1,198,287.
Patented Sept. 12, 1916.
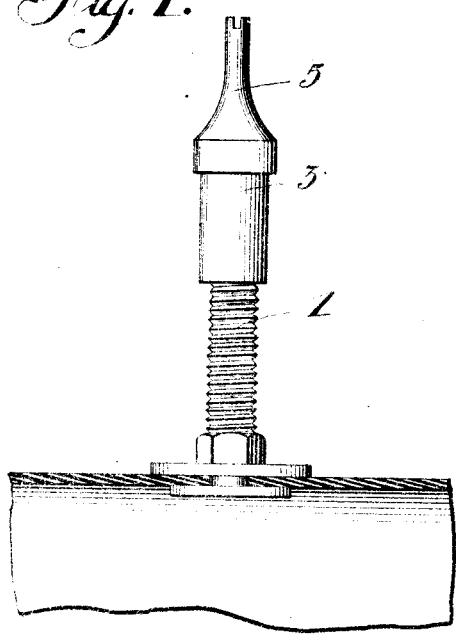
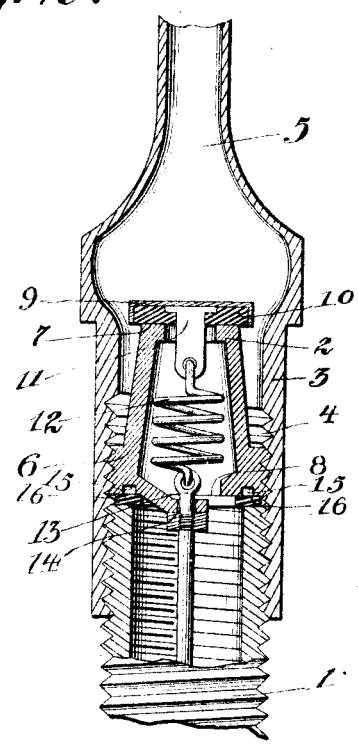
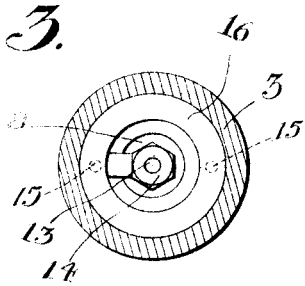
Witnesses
CJ. Maddox.
John J. McCarthy
Inventor
C. G. Spencer.
By Victor J. Evans
Attorney

UNITED STATES PATENT OFFICE.

CHARLES G. SPENCER, OF EAST ORANGE, NEW JERSEY.

ATTACHMENT FOR PNEUMATIC-TIRE VALVES.

1,198,287.      Specification of Letters Patent.      Patented Sept. 12, 1916.

Application filed November 23, 1915. Serial No. 63,003.

*To all whom it may concern:*

Be it known that I, CHARLES G. SPENCER, a citizen of the United States, residing at East Orange, in the county of Essex and State of New Jersey, have invented new and useful Improvements in Attachments for Pneumatic-Tire Valves, of which the following is a specification.

This invention relates to improvements in attachments for pneumatic tire valves and has particular application to a device for releasing excess pressure from the tire.

In carrying out the present invention, it is my purpose to provide a device of the class described which may be conveniently and quickly applied to any pneumatic tire valve and secured thereto, and which will act to release excess pressure from the tire, thereby preventing blow-outs and the like due to the heating and expanding of the air in the pipe after the tire has been pumped up to the normal pressure.

It is also my purpose to provide a device of the class described which will embrace the desired features of simplicity, efficiency and durability, which may be manufactured and marketed at small cost, which will operate efficiently and effectively for its intended purpose under all conditions, and wherein the component parts will be so arranged and correlated as to reduce the possibility of derangement to a minimum.

With the above and other objects in view, the invention consists in the construction, combination and arrangement of parts hereinafter set forth in and falling within the scope of the claim.

In the accompanying drawing, Figure 1 is a view in side elevation of a pneumatic tire valve equipped with my improved attachment. Fig. 2 is a longitudinal sectional view through my device. Fig. 3 is a cross sectional view through the same.

Referring now to the drawing in detail, 1 designates a pneumatic tire valve of any suitable construction, while 2 indicates my improved attachment for the valve 1. In the present instance, this attachment 2 is in the form of a cap for the casing of the valve 1 and embodies the tubular shell 3 threaded interiorly as at 4 at one end for a portion of its length and having the remaining end formed with an outwardly projecting nipple 5 shaped after the fashion of the nipple on the usual valve cap. Threaded into the shell 3 is a barrel 6 having the end adjacent to the nipple 5 formed to provide a valve seat 7, and the opposite end formed with an aperture 8. Engaging the seat 7 is a valve disk 9 faced with leather 10 or other suitable packing adapted to engage the seat 7 to form an air tight joint between the valve disk and the seat. Secured to the seat side of the disk 9 is a boss 11 extending into the barrel 6 and fastened to the inner end of the boss is one end of a retractile spring 12. The remaining end of the retractile spring 12 is fastened to an eye bolt 13 passed through an opening formed in the center of the inner end of the barrel and threaded onto the stem of the eye bolt is an adjusting nut 14 whereby the tension of the spring 12 may be varied so that the pressure of the valve against the seat may be changed. The threaded end of the eye bolt and the nut 14 project beyond the adjacent end of the barrel 6, as clearly illustrated in Fig. 2 of the drawing, and formed in the lower end of the barrel at diametrically opposite points are rests 15 adapted to receive a spanner wrench whereby the barrel may be threaded into the shell and removed therefrom, and secured to the inner end of the barrel concentrically of the eye bolt and nut thereon is a packing washer 16 of a diameter equal to the similar dimension of the casing of the valve 1.

In the present instance, the barrel 6 is shown as tapering from its point of connection with the shell toward the nipple 5 and in this connection, I wish it to be understood that the barrel may be shaped as desired.

In practice, the tire is pumped up to the normal pressure and the attachment 2 threaded onto the valve casing to close the open end of such casing. When the shell 3 of the attachment is threaded onto the valve casing, the threaded stem of the eye bolt carrying the nut 14 engages the stem of the valve with the effect to unseat the valve and so let the air from the tire flow into the barrel 6. The spring 12 is adjusted to hold the valve disk 9 in engagement with the seat 7 as long as the pressure in the tire remains normal so as to prevent the escape of air from the tire. When, however, the pressure in the tire rises above the normal, the valve 9 is unseated against the action of the spring 12, thereby releasing the excess pressure and as soon as the pressure in the tire falls to normal, the spring 12 reacts to seat the disk 9, thereby preventing further escape of air from the tire.

I claim:

A pressure relief valve for pneumatic tires comprising a cap embodying a tubular shell adapted to be threaded onto the tube of the tire valve, a barrel threaded into said tubular shell and having one end thereof formed with a valve seat and the other end formed with a central opening and with an eccentric opening, the eccentric opening establishing communication between the barrel and the valve tube, a valve disk engaging said seat, a spring in said barrel having one end connected to said valve disk, and an eye bolt adjustably mounted in the center opening and connected to the other end of said spring whereby the tension of the spring may be varied.

In testimony whereof I affix my signature in presence of two witnesses.

CHARLES G. SPENCER.

Witnesses:
MARK MAYELS,
S. D. ALKINE.